United States Patent
Ikeda et al.

(10) Patent No.: US 7,082,852 B2
(45) Date of Patent: Aug. 1, 2006

(54) CABLE AND/OR THE LIKE SUPPORTING AND GUIDING DEVICE

(75) Inventors: Masaaki Ikeda, Osaka (JP); Shoichiro Komiya, Osaka (JP); Takayuki Matsuda, Osaka (JP); Hideaki Minami, Osaka (JP); Kazuo Kishida, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 209 days.

(21) Appl. No.: 10/689,502

(22) Filed: Oct. 18, 2003

(65) Prior Publication Data
US 2004/0083709 A1 May 6, 2004

(30) Foreign Application Priority Data
Nov. 5, 2002 (JP) ............... 2002-321424

(51) Int. Cl.
*F16C 1/26* (2006.01)
(52) U.S. Cl. ..................... 74/502.6; 59/78.1
(58) Field of Classification Search ............ 74/500.5, 74/502.6; 59/78.1; 174/68.1, 21 JS
See application file for complete search history.

(56) References Cited

U.S. PATENT DOCUMENTS

| 3,779,003 | A | * | 12/1973 | Boissevain et al. | .......... 59/78.1 |
| 4,392,344 | A | * | 7/1983 | Gordon et al. | .......... 59/78.1 |
| 6,858,797 | B1 | * | 2/2005 | Sheikholeslami et al. | ..... 174/48 |
| 2003/0177754 | A1 | * | 9/2003 | Wada et al. | .......... 59/78.1 |

FOREIGN PATENT DOCUMENTS

JP 62-88846 4/1987

* cited by examiner

*Primary Examiner*—Vicky A Johnson
(74) *Attorney, Agent, or Firm*—Woodling, Krost and Rust

(57) ABSTRACT

To provide a cable and/or the like supporting and guiding device, by which a cable and/or the like can be easily incorporated into a chain and damage of the cable and/or the like and an accident of break in a cable can be minimized. A cable and/or the like supporting and guiding device comprises a chain (CH), a cable and/or the like (CB) disposed along the chain, and a support (20), which intersects the chain to support the cable and/or the like disposed on the chain. The support is composed of a material, which is flexed in the longitudinal direction of the cable and/or the like. In a curved section of the chain, when force is applied to the cable and/or the like, the support is flexed or bent in a direction of an action of force to ensure a length of the cable and/or the like, which is required for bending.

1 Claim, 5 Drawing Sheets

US 7,082,852 B2

CABLE AND/OR THE LIKE SUPPORTING AND GUIDING DEVICE

This patent application includes a claim of foreign priority to prior filed Japanese Patent Application 2002-321424 filed Nov. 5, 2002.

TECHNICAL FIELD TO WHICH THE INVENTION PERTAINS

The present invention relates to a cable and/or the like supporting and guiding device, and more specifically relates to a cable and/or the like supporting and guiding device, which supports a cable and/or the like such as a cable, hose or the like with a chain.

RELATED ART

This kind of cable and/or the like supporting and guiding device comprises a chain having a plurality of links connected to each other with pins, a cable and/or the like, which is penetrated into the chain along the connecting direction of the link and a support for supporting the cable and/or the like, which intersects the connecting direction of the link and disposed on each of the links (for example, refer to Patent Reference 1). In the cable and/or the like supporting and guiding device, a cable or a hose, forming a cable and/or the like, is secured and supported on the support while being coincident between the link connecting center axis and the center axis of the cable and/or the like, so that sliding of the cable and/or the like in the longitudinal direction of the chain is minimized. Further, the support is composed of a molded form of soft plastic such as a polyethylene resin, and even if the cable and/or the like slides in the longitudinal direction of the chain, the damage of the cable and/or the like is minimized.

Patent reference 1, Japanese Patent Laid-open Publication No. Sho. 62-88846.

Problems to be solved by the Invention

However, in the cable and/or the like supporting and guiding device of the patent reference 1, since the cable and/or the like is supported by a support, straining the cable and/or the like is effected in a curved section whereby it can be damaged and an accident of break in a cable can be generated. Thus, it is necessary to set a cable length between supports strictly in accordance with a curvature radius of the cable and/or the like incorporating it into the chain, which requires significant labor for the setting.

Accordingly, the object of the invention is to provide a cable and/or the like supporting and guiding device, by which a cable and/or the like can be easily incorporated into a chain and damage of the cable and/or the like and an accident of break in a cable can be minimized.

Means for Solving the Problems

To solve the above-mentioned problems a cable and/or the like supporting and guiding device is characterized by comprising a chain, a cable and/or the like disposed along said chain, and a support, which intersects said chain to support the cable and/or the like disposed on said chain and by that said support is formed so that it is flexed or bent in the longitudinal direction of said cable and/or the like.

Action

The cable and/or the like supporting and guiding device according to the present invention comprises a chain, a cable and/or the like disposed along said chain, a support, which intersects said chain to support the cable and/or the like disposed on said chain and the support is formed so that it is flexed in the longitudinal direction of the cable and/or the like. Thus, when force is applied to the cable and/or the like in the longitudinal direction of the chain in a curved section, a support is flexed in a direction of action of the force to ensure a necessary length of the cable and/or the like for bending. Therefore, in the cable and/or the like supporting and guiding device according to the present invention, straining the cable and/or the like is not effected and the incorporation of the cable and/or the like into the chain can be performed without setting the length of the cable between the supports.

The invention will be better understood when reference is made to the BRIEF DESCRIPTION OF THE DRAWINGS, DETAILED DESCRIPTION OF THE INVENTION and CLAIMS which follow hereinbelow.

Figure 1:
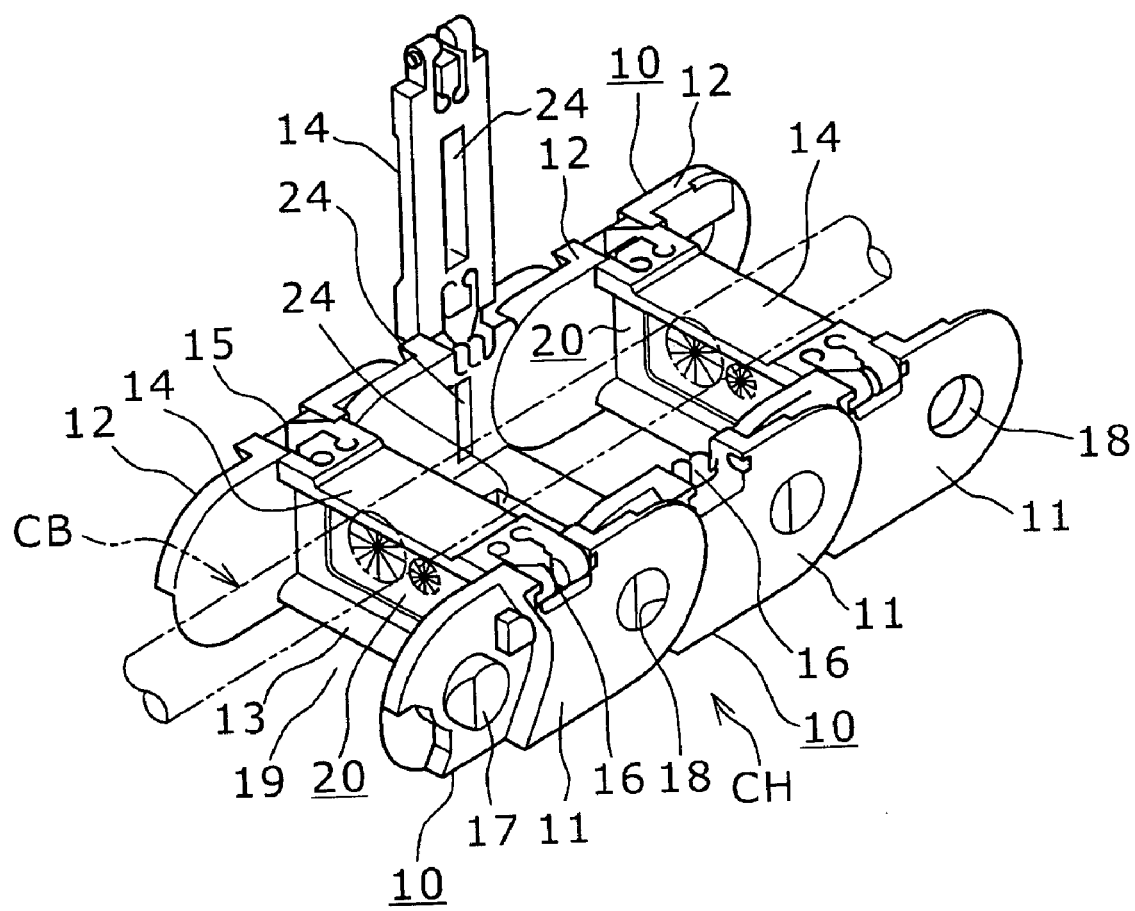
FIG. 1 is a perspective view showing an Example of a cable and/or the like supporting and guiding device according to the present invention.

A better understanding of the invention will be had when reference is made to the DETAILED DESCRIPTION OF THE INVENTION and CLAIMS which follow hereinbelow.

DETAILED DESCRIPTION OF THE INVENTION

Embodiments of the Invention

In a cable and/or the like supporting and guiding device of the present invention, according to an embodiment, a support has a supporting portion for supporting a cable and/or the like, and a connecting portion for possessing the supporting portion and connecting it to a chain, and ensures the length of a cable and/or the like necessary for bending by flexing the supporting portion. In this embodiment, the supporting of the cable and/or the like is performed by the facts that for example a supporting portion includes a penetration hole formed by a plurality of slits disposed with one end of the supporting portion intersected with the chain, the cable and/or the like is inserted into the penetration hole and a tongue portion formed between the slits is deformed, or by the facts that the supporting portion has an elongated opening having width smaller than the height or diameter of the cable and/or the like, the cable and/or the like is inserted into the elongated opening and a portion forming the elongated opening in the supporting portion is deformed.

In a cable and/or the like supporting and guiding device of the present invention, according to another embodiment, a support has a supporting portion for holding a cable and/or the like, and a connecting portion for possessing the supporting portion and connecting it to a chain, and ensures the length of a cable and/or the like necessary for bending by flexing the supporting portion. In this embodiment the supporting of the cable and/or the like is performed by the fact that for example the supporting portion has a penetration hole having a shape corresponding to a cross-sectional shape of the cable and/or the like and the cable and/or the like is secured and supported in the penetration hole.

Examples of the cable and/or the like supporting and guiding device according to the present invention will be described with reference to attached drawings below.

EXAMPLE 1

A cable and/or the like supporting and guiding device of Example 1 includes a chain CH and a cable and/or the like CB supported by the chain CH.

The chain CH comprises a number of link bodies 10. Each of the link bodies 10 includes a pair of left and right link plates 11 and 12. The link plates 11 and 12 are connected to each other with a lower connecting rod 13, which connects the lower edges thereof, and with an upper connecting rod 14, which connects the upper edges thereof. The lower connecting rod 13 is integrally formed with the link plates 11 and 12. One end of the upper connecting rod 14 is connected to the link plate 12 by a hinge mechanism 15 and the other end of the upper connecting rod 14 is connected to a stopper mechanism 16 in the link plate 12.

On the front ends of the link plates 11 and 12 pins are integrally formed, and in the rear ends of the link plates 11 and 12 pin holes 18 are provided. The link bodies are connected by the facts that the front end portions of the link body 10 are engaged with rear end portions of an adjacent link body 10 on the front side and the rear end portions of the link body 10 are engaged with front end portions of an adjacent link body 10 on the rear side whereby the link body 10 and the adjacent link body are disposed in a single row, and at the same time the pins 17 are fitted into the pin holes 18. When the link bodies 10 are connected to each other, a hollow portion 19 extending in the longitudinal direction of the chain CH is formed inside the chain CH.

A cable and/or the like CB penetrates through the hollow portion 19 in the chain CH. The supports 20 are incorporated between the respective link plates 11 and 12 to support the cable and/or the like CB.

Figure 2:
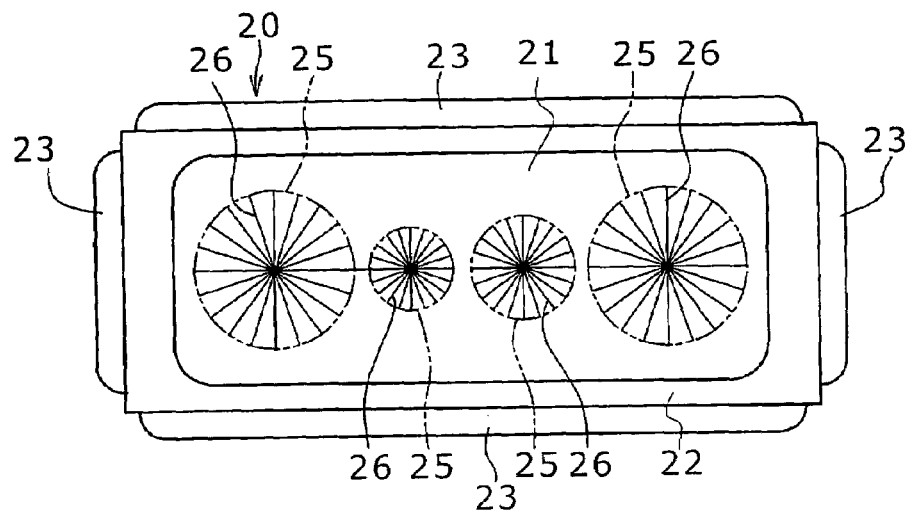
FIG. 2 is a front view of a support forming the cable and/or the like supporting and guiding device shown in FIG. 1.
Figure 3:
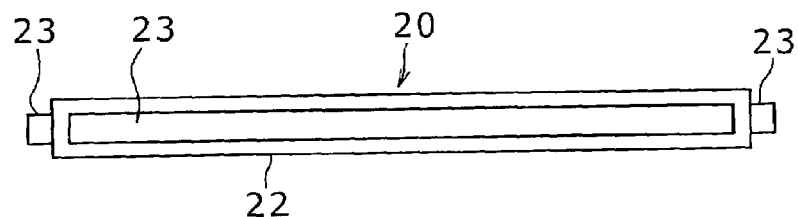
FIG. 3 is plan view of the support shown in FIG. 2.

FIGS. 2 and 3 show details of the support 20. Each of the supports 20 is composed of an injection molded form of a thermoplastic elastomer. The support 20 includes a supporting portion 21 and a connecting portion 22 as shown in FIG. 4.

The connecting portion 22 has a rectangular shape as shown in FIG. 3. Protruded portions 23 of the support 20 are integrally formed on outer surfaces thereof. On the other hand, as shown in FIG. 1, on the insides of the link plates 11, 12, the lower connecting rod 13 and the upper connecting rod 14 forming the link body 10 of the chain CH are provided grooves 24 into which the protruded portions 23 are fitted.

The connecting portion 21 has a rectangular flat plate having thinner thickness than that of the connecting portion 22, and includes at least one of penetration hole 25. A cable and/or the like is penetrated through the penetration hole 25 and is supported by it. In Example 1, there are for example four cables or the like, which have circular cross-sections having different diameters, respectively. Each of the penetration holes 25 has a virtual circle having substantially the same diameter as that of the cable and/or the like CB, as shown in FIG. 2 by a chain line. Each penetration hole 25 is formed by slits 26 radially formed with respect to the center of the virtual circle. These slits 26 are disposed such that one ends of the slits 26 are crossed at the center of the virtual circle and the slits 26 are disposed at equal angles to each other with respect to the center of the virtual circle.

Figure 4:
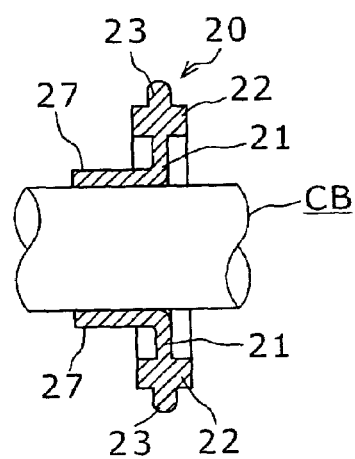
FIG. 4 is a cross-sectional view showing an attachment state of the cable or the like to the support shown in FIG. 2.

The incorporation of the cable and/or the like CB to the chain CH is performed as shown in FIGS. 1 and 4, by the facts that supports 20 are fitted to the cable and/or the like CB, protruded portions 23 are pushed into grooved 24 insides of the link plates 11, 12, the lower connecting rods 13 to incorporate the support 20 into the chain CH, and upper connecting rods 14 are closed to fit grooves 24 in the upper connecting rods 14 to protruded portions 23.

After the cable and/or the like CB is incorporated to the chain CH, tongue portions 27 between the slits 26 forming the penetration hole 25 in each of the supports 20 are bent in the root portion as shown in FIG. 4, whereby the tongue portions 27 are press-adhered to the surface of the cable and/or the like CB and secure and support the cable and/or the like CB.

This cable and/or the like supporting and guiding device is used as a supporting and guiding device for a cable and/or the like, which connects for example a horizontal boring machine to attached equipment. The cable and/or the like is a power source cable, which connects an electric generator in a spindle head and a power source device, and a coolant hose, which connects a coolant nozzle on a spindle head and a coolant tank.

Figure 5:
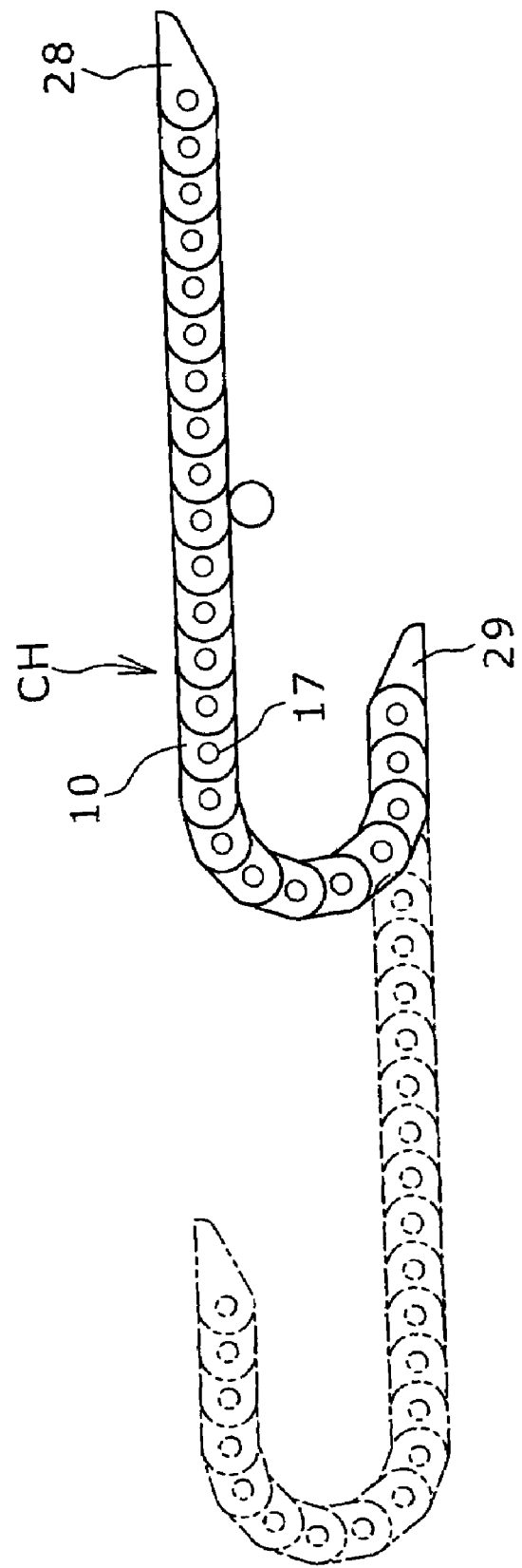
FIG. 5 is an explanatory view showing a state of use of the cable and/or the like supporting and guiding device shown in FIG. 1.

In this cable and/or the like supporting and guiding device, as shown in FIG. 5 a movable end fitting 28 is connected to one end of the link bodies 10 of the chain CH and a fixed end fitting 29 is connected to the other end of the link plates of the chain CH with a pin respectively. The movable end fitting 28 is pin-connected to the spindle head and the fixed end fitting 29 is pin-connected to a bed or column.

When the spindle head is moved, the chain CH is contracted in accordance with the movement of the spindle head as shown in FIG. 5 by chain lines and the spindle head is followed by the power source cable and coolant hose.

Then, since the tongue portion 27 is press-adhered to the power source cable and the coolant hose in a straight section, the power source cable and the coolant hose are secured and supported by the supports 20. Therefore, the cable and/or the like CB is not slid in the longitudinal direction of the chain and the surface or the cover of the cable and/or the like is not damaged. In a curved section, when force is applied to the power source cable and coolant hose, the supports 20 are flexed thereby imparting excess lengths to the cable and the hose. That is each of the supports 20 on one side is drawn with reference to the apex of the curved section in a direction and each of the supports on the opposite side are drawn in the opposite direction, whereby excess lengths are imparted to the cable and the hose. Thus straining the cables or the like consisting of the power source cable and the coolant hose is not effected and the cable and/or the like CB are not damaged and break in the cable does not occur.

Further, each of the power source cable and the coolant hose, which form a cable and the like is supported by separate penetration holes 25 to maintain initially set conditions. That is, since the arrangement distance between the power source cable and the coolant hose is not always changed as well as the cable and the like CB does not slide in the longitudinal direction of the chain, the same power source cables and the same coolant hoses do not become entangled respectively and the entanglement between the power source cable and the coolant hose does not occur.

Further, even if vibration is transmitted to the chain CH, the supports 20 composed of thermoplastic elastomer absorb this vibration so that the power source cable and the coolant hose do not vibrate.

EXAMPLE 2

Figure 6:
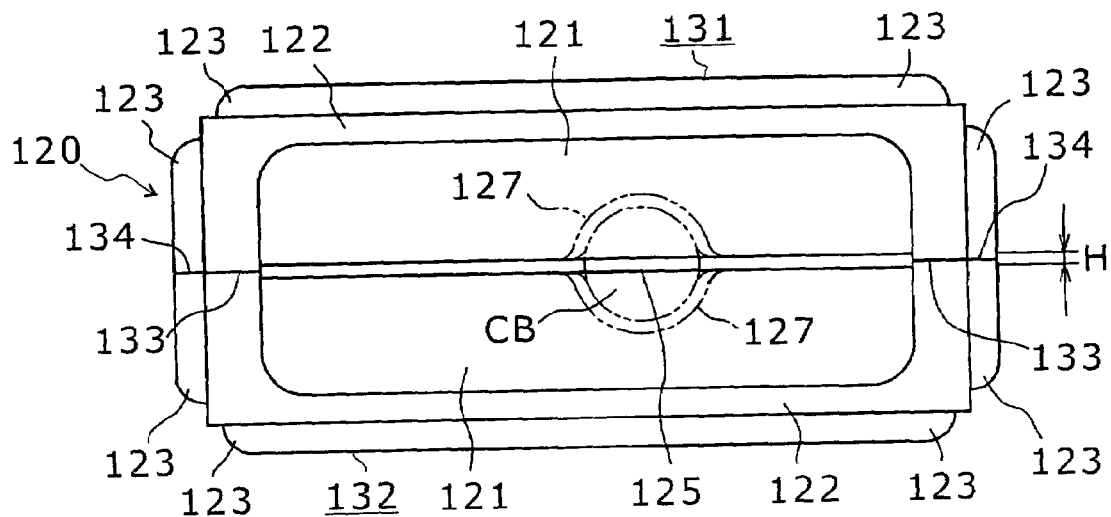
FIG. 6 is a front view of another Example of a cable or the like supporting and guiding device according to the present invention.
Figure 7:
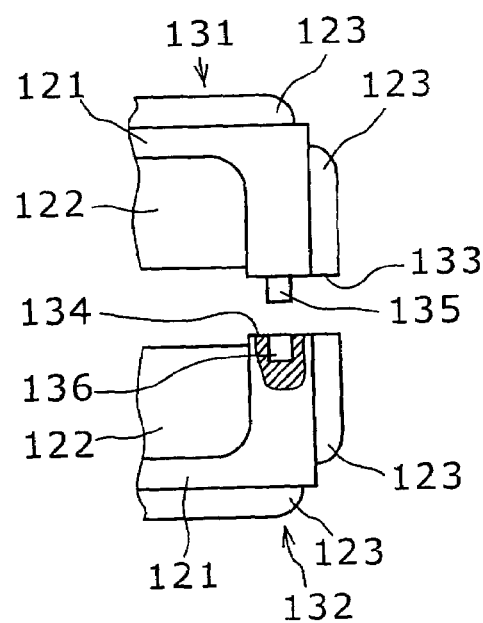
FIG. 7 is a partially cutaway view of a state where the support shown in FIG. 5 was disassembled.

FIGS. 6 and 7 show another embodiment of a cable and/or the like supporting and guiding device according to the present invention.

This cable and/or the like supporting and guiding device also includes the same chain formed as in the cable and/or the like supporting and guiding device described in FIGS. 1 to 5, and has only different configuration of the support.

This support 120 is composed of an injection-molded form of a thermoplastic elastomer. The support 120 is composed of two support portions 131 and 132. These support portions 131 and 132 are obtained by dividing the support 120 into two portions with a division line (division plane 133), which is parallel to the center axis of a side.

The support portion 131 includes a supporting 121 and a connecting portion 122. The connecting portion 122 has a rectangular shape in its section. A protruded portion 123, which is fitted to a groove of the chain, is formed integrally with the outer surface of the support portion 131. The supporting portion 121 is composed of a flat plate having a rectangular shape in its section and a thickness thinner than that of the connecting portion 122. The division plane 133 of the supporting portion 121 is shorter by a length of H than the lower surface of the connecting portion 122. The support portion 132 has the same configuration as that of the support portion 131.

Further, the division plane 133 of the connecting portion 122 forming the support portion 131 is provided with a protrusion 135. The protrusion is integrally formed with the connecting portion 122. The division plane 134 of the support portion 132 is provided with a recess 136. These support portions 131 and 132 form one support 120 having a penetration hole 125, which supports a cable and/or the like, by press-fitting the protrusion 135 into the recess 136. Since there is a difference H in length between the lower surface of the supporting portion 121 and the lower surface of the connecting portion 122, the penetration hole 125 has an elongated opening extending along the center axis of the side of the support 120.

The incorporation of the cable and/or the like into the chain is performed by the steps of attaching the support portion 132 onto the chain, placing the cable and/or the like on the top of the supporting portion 121 of the support portion 132, fitting the protrusion 133 into the recess 136 to connect the support portion 131 to the support portion 132, and closing the upper connecting rod thereby fitting the groove in the connecting rod to the protruded portion 123 of the support 120.

The cable or the like CB is press-fitted into the penetration hole as shown in FIG. 6 by a two dotted chain line and both side portions 127 of the penetration hole 125 in the supporting portions 121 and 122 are flexed so that it is press-adhered onto the surface of the cable or the like CB.

This cable or the like supporting and guiding device is used as a supporting and guiding device for a cable and/or the like, which connects for example a horizontal boring machine to attached equipment in the same manner as in the cable and/or like supporting and guiding device described with reference to FIGS. 1 to 5.

On end of the link bodies of the chain is connected to a movable end fitting and the other end of the link bodies of the chain is connected to a fixed end fitting. Further the movable end fitting is connected to the spindle head and the fixed end fitting is connected to a bed or column.

When the spindle head is moved, the chain is contracted in accordance with the movement of the spindle head and the spindle head is followed by the power source cable and coolant hose.

Then, since both side portions 127 of the penetration portion 125 in the supporting portions 121 is press-adhered to the power source cable and the coolant hose in a straight section, the power source cable and the coolant hose are secured and supported by the supports 120. Therefore, the cable or the like CB is not slid in the longitudinal direction of the chain and the surface or the cover of the cable and/or the like is not damaged. In a curved section, when force is applied to the power source cable and coolant hose, the support portions 121 are flexed thereby imparting excess lengths to the cable and the hose. Thus straining the cables or the like consisting of the power source cable and the coolant hose is not effected so that the cables or the like CB is not damaged and break in the cable does not occur.

Further, each of the power source cable and the coolant hose, which form a cable and the like is supported by separate penetration holes 25 to maintain initially set conditions. That is, since the arrangement distance between the power source cable and the coolant hose is not always changed, the same power source cables and the same coolant hoses do not become entangled respectively and the entanglement between the power source cable and the coolant hose does not occur. Further, even if vibration is applied to the cable and/or the like supporting and guiding device, the supports 120 absorb the vibration and do not transmit it to the power source cable and the coolant hose.

Further, in Example 2, the support 120 is divided into two parts, and one support portion 131 is removed from the chain. Accordingly, the incorporation and replacement of the power source cable and the coolant hose and so on can be performed, setting and maintenance of the cable and/or the like can be easily, rapidly carried out.

EXAMPLE 3

Figure 8:
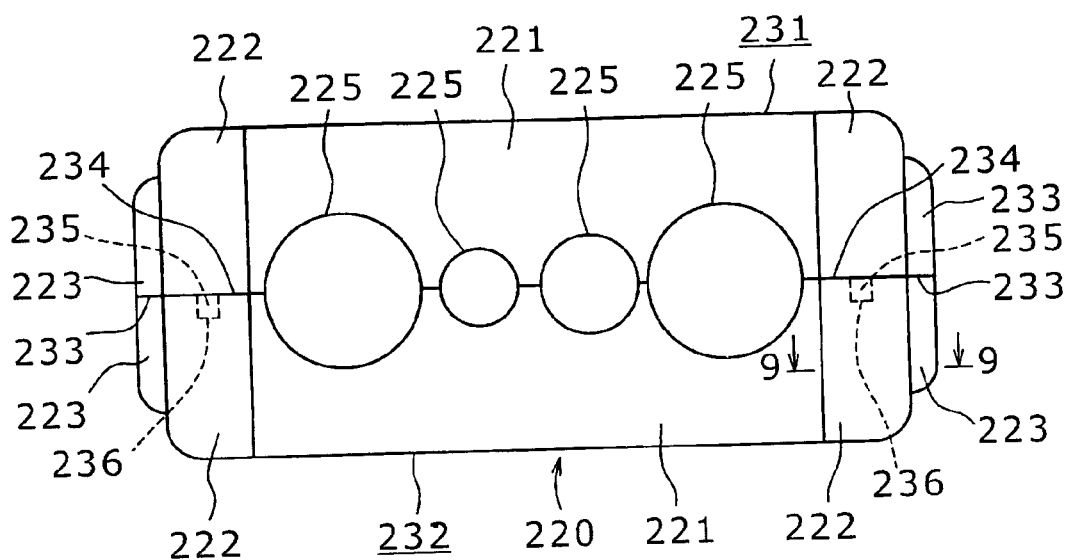
FIG. 8 is a still another Example of a cable and/or the like supporting and guiding device according to the present invention.
Figure 9:
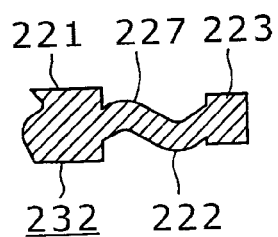
FIG. 9 is an enlarged cross-sectional view taken along the line 9—9 in FIG. 8.

FIGS. 8 and 9 show still another embodiment of a cable and/or the like supporting and guiding device according to the present invention.

This cable and/or the like supporting and guiding device also includes the same chain formed as in the cable and/or the like supporting and guiding device described in FIGS. 1 to 5, and has only different configuration of the support.

FIG. 8 shows only a support 220. This support 220 is composed of an injection-molded form of a thermoplastic elastomer. The support 220 is composed of two support portions 231 and 232 obtained by dividing the support 220 into two portions in a direction of the center axis of a side, as in the support 120 shown in FIGS. 6 and 7.

The supporting portion 221 of each of the support portions 231 and 232 is composed of a flat plate having a rectangular shape in its section and has a thickness larger than a connecting portion 222 as shown in FIG. 9. The supporting portions 221 include four penetration portions 225 through which cables or the like are press-fitted, respectively. The penetration portion 225 has a circular opening having substantially the same diameter of a cable or the like, which is inserted therethrough. Since the support 220 is divided into two parts, the supporting portion 221 of each of the supporting portions 231 and 232 has the penetration portion 225 having a semicircular opening, which is half said circular opening.

Further, the connecting portion 221 of each of the support portions 231 and 232 is integrally formed with the supporting portion 221. This connecting portion 222 is thinner than the supporting portion 221 and is formed in a wave type as shown in FIG. 9. This wave type portion 227 is formed by a plurality of waves having concave and convex portions in the fore-and-aft direction of the support 220 and having grooves extending in the vertical direction of the support 220. Protruded portions 223 are formed on only both side edges of the connecting portions 222. The chain has grooves into which these protruded portions 223 are fitted, on the inside surfaces of the link plates.

Further, one connecting portion 222 has a protrusion 235 on a division plane 233 and the other connecting portion 222 has a recess 236 on a division plane 234. The support portions 231 and 232 form a support 220 by fitting the protrusion 235 into the recess 236, and a penetration portion 225 through which a cable or the like is penetrated and which supports it is formed by two semicircular openings.

The incorporation of the cable and/or the like into the chain is performed by the steps of attaching the support portion 232 onto the chain, placing the cable and/or the like on the penetration portion 225 of the supporting portion 221 of the support portion 232, fitting the protrusion 233 into the recess 236 to connect the support portion 231 to the support portion 232, and closing the upper connecting rod thereby fitting the groove in the connecting rod to the protruded portion 223 of the support 220.

The cable or the like CB is press-fitted into the penetration hole. Then since the support portion 221 has a large thickness, it is not flexed, and a portion forming the penetration portion 225 in the supporting portions 22, that is an inner wall of the circular opening 225 is press-adhered to the surface of the cable or the like.

This cable and/or the like supporting and guiding device is used as a supporting and guiding device for a cable and/or the like, which connects for example a horizontal boring machine to attached equipment in the same manner as in the cable and/or like supporting and guiding device described with reference to FIGS. 1 to 5.

On end of the link bodies of the chain in this cable and/or the like supporting and guiding device is connected to a movable end fitting and the other end of the link bodies of the chain is connected to a fixed end fitting. Further the movable end fitting is connected to the spindle head and the fixed end fitting is connected to a bed or column.

When the spindle head is moved, the supporting and guiding device is elongated/contracted in accordance with the movement of the spindle head and the spindle head is followed by the power source cable and coolant hose.

Then, since the supporting portions 221 secure and support the power source cable and the coolant hose in a straight section, the power source cable and the coolant hose do not slide in the longitudinal direction of the chain. Further, since each supporting portion 221 is composed of a thermoplastic elastomer the surface or the cover of the cable and/or the like is not damaged. In a curved section, when force is applied to the power source cable and coolant hose, the connecting portions 222 are flexed in a direction of action of force thereby imparting excess lengths to the cable and the hose. Thus straining the cables or the like consisting of the power source cable and the coolant hose is not effected so that the cables or the like CB is not damaged and break in the cable does not occur.

Further, even if the chain is vibrated, the connecting portions 222 absorb this vibration, and the vibration is not transmitted to the cable and the like of the power source cable and the coolant hose. And the power source cable and the coolant hose, which form a cable and the like is supported by separate supporting portion 221 to maintain initially set conditions. That is, since the arrangement distance between the power source cable and the coolant hose is not always changed, the same power source cables and the same coolant hoses do not become entangled respectively and the entanglement between the power source cable and the coolant hose does not occur.

Further, in Example 2, the support 220 is divided into two parts, and one support portion 231 is removed from the chain. Accordingly, the incorporation and replacement of the power source cable and the coolant hose and so on can be performed, setting and maintenance of the cable and/or the like can be easily, rapidly carried out.

In Examples described above, the chain CH comprises pin-connected link structure, that is a structure in which the respective pins of the links are fitted to pin holes of adjacent links, respectively and the respective pin holes of the links are fitted onto the pins of adjacent links, respectively. However, the present invention is not limited to only such a chain and chains having other configurations may be adopted. Further, a chain in which each of links has a joint to an adjacent link, that is a chain having a structure in which each of links forming a chain includes a connecting rod on one side edge of a side plate and a connecting groove on the opposite side edge of another side plate, the connecting rod is fitted into a connecting groove of a front adjacent link, and a connecting groove is fitted onto a rear adjacent link, may be used. Further, a chain in which each of links is connected to a belt material, that is a chain having a structure a belt material of an elastic material is connected to the adjacent link, may be used.

Further, the supports 20, 120 and 220 are composed of single-color thermoplastic elastomer molded forms. However, supporting portions 21, 121 and 221 may be molded in different colors from the connecting portions 22, 122 and 222 so that attachment of the cable and/or the like can be easily made.

Further, the supports 20, 120 and 220 may be composed of another elastomer such as rubber or the like.

Additionally, in Example 1 described with reference to FIGS. 1 to 5, the supporting portion 21 and the connecting portion 22 forming the support 20 are composed of thermoplastic elastomer molded forms. However, the supporting portion 21 and the connecting portion 22 are formed as separate members and a support 20 may be formed by assembling the separate supporting portion 21 and connecting portion 22. Also, in Example 2 and Example 3, each of the support portions 131, 132, 231 and 232 may be formed as different members from the supporting portions 121 and 222 and the connecting portions 122 and 222, respectively so that they are assembled as supports 120, 220, respectively.

Effects of the Invention

As described above, the cable and/or the like supporting and guiding device according to the present invention comprises a chain, a cable and/or the like disposed along said chain, a support, which intersects said chain to support the cable and/or the like disposed on said chain and the support is formed so that it is flexed in the longitudinal direction of the cable and/or the like. Thus, when force is applied to the cable and/or the like in the longitudinal direction of the chain in a curved section, a support is flexed in a direction of action of the force to ensure a necessary length of the cable and/or the like for bending. Therefore, in the cable and/or the like supporting and guiding device according to the present invention, straining the cable and/or the like is not effected and the incorporation of the cable and/or the like into the chain can be easily, rapidly performed without setting the length of the cable between the supports.

Description of Reference Numerals

CH . . . Chain

CB . . . Cable and/or the like supporting and guiding device 20, 120, 220 . . . Support The invention has been described by way of examples only and those skilled in the art will readily recognize that certain changes and modifications may be made to the examples without departing from the spirit and scope of the appended claims.

We claim:

1. A cable supporting and guiding device comprising a chain, a cable disposed along said chain and a support, said support intersects said chain and supports said cable disposed in said chain, wherein said support is comprised of an elastomer containing a rubber and a thermoplastic elastomer and has a connecting portion fixed to said chain and a supporting portion held by said connecting portion which supports said cable, said supporting portion having a cable penetration hole formed so that a plurality of tongue portions formed of radial slits are flexed in the longitudinal direction of said cable in a deformable manner.

* * * * *